United States Patent [19]

Wu et al.

[11] Patent Number: 5,239,761
[45] Date of Patent: Aug. 31, 1993

[54] MULTIPLE-PURPOSE MEASURING INSTRUMENT

[76] Inventors: Chyi-Yiing Wu; Chih-Jen Hsu, both of P.O. Box 55-1670, Taipei, Taiwan

[21] Appl. No.: 747,270

[22] Filed: Aug. 19, 1991

[51] Int. Cl.$^5$ .................... B43L 7/00; G01C 9/00
[52] U.S. Cl. ........................ 33/451; 33/471; 33/342; 33/760; 33/414; 33/381; 33/392; 33/399; 33/565
[58] Field of Search ............... 33/451, 342, 471, 760, 33/756, 414, 399, 379, 381, 392, 393, 394, 563–566

[56] References Cited

U.S. PATENT DOCUMENTS

| | | | |
|---|---|---|---|
| 501,774 | 7/1893 | Dunnington | 33/480 |
| 642,888 | 2/1900 | Van Vliet | 33/393 |
| 862,139 | 8/1907 | Darrow | 33/760 |
| 1,473,877 | 11/1923 | Rome | 33/474 |
| 1,583,138 | 5/1926 | Garnett | 33/566 |
| 3,533,167 | 10/1970 | Thompson et al. | 33/379 |
| 3,568,322 | 3/1971 | Showers | 33/393 |
| 3,721,009 | 3/1973 | Lucich | 33/414 |
| 4,151,650 | 5/1979 | Russo | 33/451 |
| 4,317,289 | 3/1982 | Conn | 33/451 |
| 4,438,538 | 3/1984 | Larsen | 33/479 |
| 4,656,752 | 4/1987 | Wu | 33/399 |
| 4,921,507 | 5/1990 | Beyer | 33/414 |

FOREIGN PATENT DOCUMENTS

| | | | |
|---|---|---|---|
| 0634725 | 11/1959 | Italy | 33/451 |
| 0266920 | 5/1950 | Switzerland | 33/760 |
| 443704 | 2/1968 | Switzerland | 33/451 |

Primary Examiner—William A. Cuchlinski, Jr.
Assistant Examiner—Alvin Wirthlin

[57] ABSTRACT

A measuring instrument includes a casing served as a rule, an angular level secured in a central portion of the casing having a rotational protractor rotatably mounted in the level for measuring any angles, a horizontal gauge provided in a right side portion of the casing for checking a horizontality, a vertical gauge formed in a left side portion of the casing for checking a verticality, a reelable plummet provided in the casing and protruded outwardly for checking a vertical line or plane, a measuring tape wound in the casing and pulled outwardly for measuring a length, and a protractor template rotatably secured on the casing having a plurality of guide slots of many geometric shapes punched in the template for guiding the drawing of many geometric shapes and having a plurality of angular graduations circularly formed on a pivotal portion of the template also for measuring planar angles, so as to provide a measuring instrument having multiple measurement uses.

2 Claims, 4 Drawing Sheets

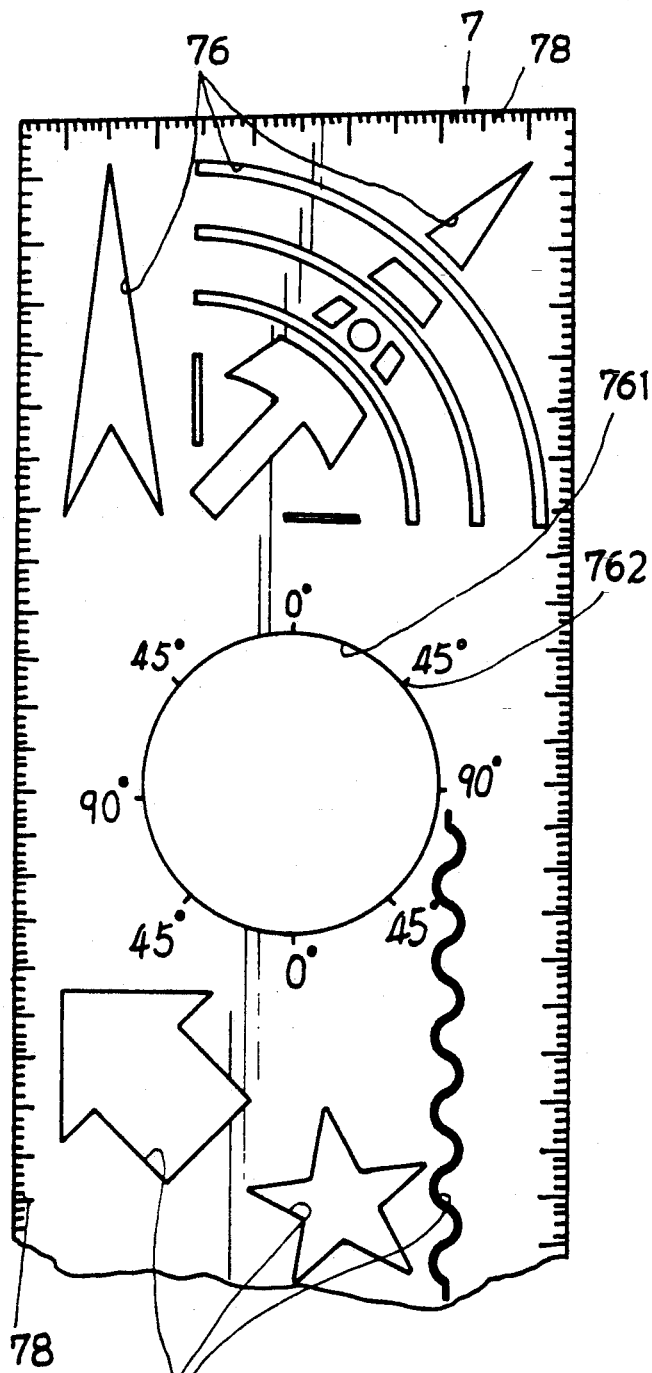
FIG. 7
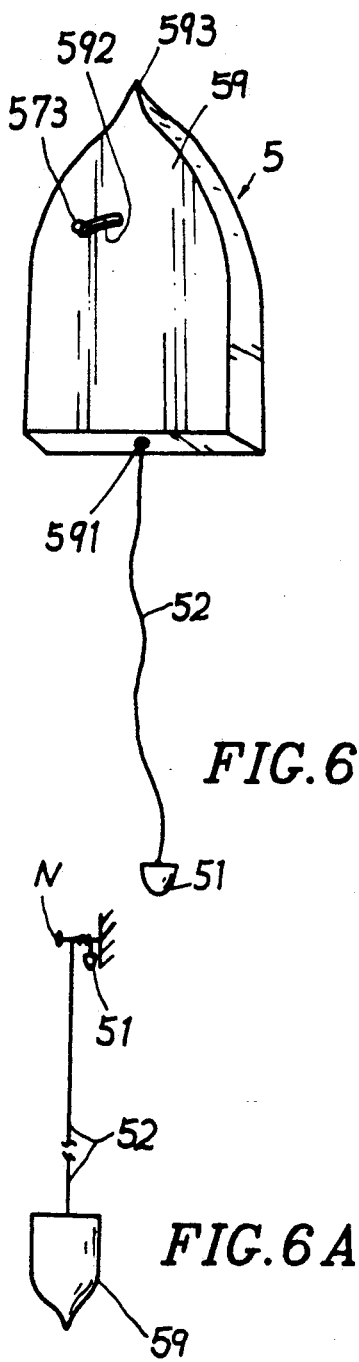
FIG. 6
FIG. 6A

MULTIPLE-PURPOSE MEASURING INSTRUMENT

BACKGROUND OF THE INVENTION

Even a conventional hand level may install a horizontal tube and a vertical tube in a common casing or frame for checking a horizontal plane and a vertical plane, it does not include a plummet in the instrument. In a civil engineering construction site, a plumb bob is always used to check a vertical line such as for building a vertical column, wall or for installing a plurality of layers of tiles on a vertical wall, whereas the horizontal tube provided in the conventional hand level is only used for establishing a horizontality for a horizontal floor, beam or surface under construction. The vertical tube provide in the conventional hand level may even be used for checking a vertical line of a construction structure.

However, the hand level, once vertically contacted with the wall to be checked, can only calibrate a very small wall section whether vertical or not because a length of the hand level is quite limited, such less than a length of a plummet pendantly hanged by a longer wire.

It is therefore expected to disclose an instrument having a plurality of measuring tools commonly provided in the instrument for multiple purposes.

SUMMARY OF THE INVENTION

The object of the present invention is to provide a measuring instrument including a casing served as a rule, an angular level secured in a central portion of the casing having a rotational protractor rotatably mounted in the level for measuring any angles, a horizontal gauge provided in a right side portion of the casing for checking a horizontally, a vertical gauge formed in a left side portion of the casing for checking a verticality, a reelable plummet provided in the casing and protruding outwardly for checking a vertical line or plane, a measuring tape wound in the casing and pulled outwardly for measuring a length, a protractor template rotatably secured on the casing having a plurality of guide slots of many geometric shapes punched in the template for guiding the drawing the drawing of many geometric shapes and having a plurality of angular graduations circularly formed on a pivotal portion of the template also for measuring planar angles, so as to provide a measuring instrument having multiple measurement uses.

BRIEF DESCRIPTION OF THE DRAWINGS

FIG. 6 shows a plummet housing taken out from the casing of the plummet.

FIG. 6A shows a pendant plummet housing.

FIG. 7 shows another template of the present invention.

DETAILED DESCRIPTION

Figure 1:
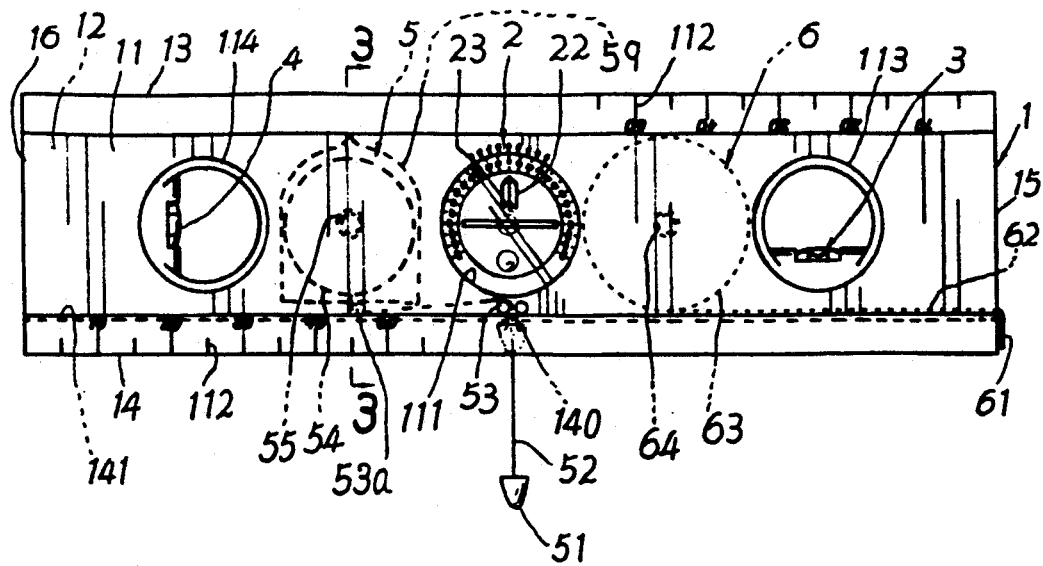
FIG. 1 is a front view of the present invention.

As shown in FIGS. 1, 2, 3, and 5, the present invention comprises: a casing 1, an angular level 2, a horizontal gauge 3, a vertical gauge 4, a reelable plummet 5, a measuring tape 6, and a protractor template 7.

The casing 1 is formed as a longitudinal parallelepiped comprised of: a front plate 11, a rear plate 12, an upper plate 13, a bottom plate 14, a right side plate 15, and a left side plate 16.

The front plate 11 includes: a central opening 111 formed in a central portion of the front plate, two length scales 112 respectively longitudinally formed on an upper edge portion and a lower edge portion of the front plate 11, a right opening 113 formed in a right portion of the front plate 11 and a left opening 114 formed in a left portion of the front plate 11.

The rear plate 12 includes: a circular extension 121 formed in a central portion of the rear plate 12 defining a rear central opening 122 corresponding to the central opening 111 of the front plate 11, a first side opening 123 formed in a first side portion of the rear plate 12 corresponding to the central opening 111 of the front plate 11, a first side opening 123 formed in a first side portion of the rear plate 12 corresponding to the right opening 113 of the front plate 11 and a second side opening 124 formed in a second side portion of the rear plate opposite to the first side opening 123 and corresponding to the left opening 114 of the front plate 11.

The angular level 2 is a conventional level for measuring any angles at any sloping, horizontal, or vertical surface, which was invented by the same inventor of this invention entitled "Precise-reading Angular Level" of U.S. Pat. No. 4,656,752 patented on Apr. 14, 1987. The precise-reading 21 angular level includes a casing 20, a rotational protractor 21 rotatably mounted in the casing, a plumbing swing wheel 22 pivotedly mounted in the protractor, and a vernier 23 formed on the central top position of the casing above the protractor, wherein the protractor is made to have an outer angle scale matching with the vernier scale and an inner angel scale operatively coinciding with a pointer printed on the swing wheel to prevent strabismal reading error, and an aligning pointer is formed on the protractor to projectively superimpose the pointer on the wheel for convenient reading of the measuring angle even after removing the level from the measuring position.

The horizontal gauge 3 includes a horizontal tube filled with liquid in the tube having an air bubble formed in the liquid for checking a horizontality by this invention, and is fixed in a right opening 113 and a first opening 123 formed in the front and rear plates 11, 12.

The vertical gauge 4 includes a vertical tube filled with liquid in the tube having an air bubble formed in the liquid, and is fixed in a left opening 114 in the front plate 11 and in a second opening 124 in the rear plate 12 for checking a verticality of this invention.

The reelable plummet 5 telescopically mounted in the casing 1 includes: a bob 51 secured with a wire 52 wound on a wire reel 54 rotatably secured on a spindle 55 secured in the casing 1 between the vertical gauge 4 and the angular level 2, two first rollers 53 pivotally formed in a central lower portion of the casing 1 for slidably guiding the wire 52 of the bob 51 therebetween for directing the bob 51 and wire 52 outwardly vertically from the casing 1, a second roller 53a pivotally formed under the reel 54 for guiding the wire 52 towards the rollers 53 and a restoring the wire reel 54 for rewinding the wire 52 on the reel 54 to normally retract the bob 51 into the casing 1. The wire 52 is protruded outwardly through a central opening 140 formed in the bottom plate 14.

The wire 52 of the reelable plummet 5 may be led through a wire trough 141 longitudinally recessed in the bottom plate 14 of the casing 1, having a cross section of generally V shaped, for storing the bob 51 into a cavity formed in the casing 1 through a side opening formed at the side plate 16 of the casing 1 when not in use.

Figure 3:
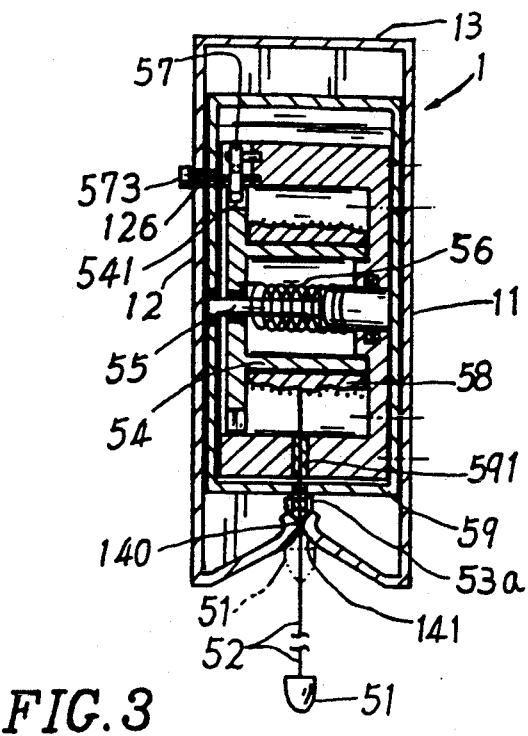
FIG. 3 is a sectional drawing of the present invention when viewed from 3—3 direction of FIG. 1.

The plummet 5 with the reel 54, spindle 55 and spring 56 may be encased in a plummet housing 59 having a tapered cone portion 593 as shown in FIGS. 3 and 6.

The wire 52 of the reelable plummet 5 may be wound on an ink absorber 58 such as a sponge impregnated with ink disposed around the wire reel 54 as shown in FIG. 3 through a housing opening 591 and through the central opening 140 formed as a venturi throat formed in a central portion of the bottom plate 14 of the casing 1 so that the wire will be coated with ink thereon to serve as an ink line for lining a color line on a wooden work piece or the like. The wire 52 and the ink absorber 58 formed on the reel 54 will serve as an "ink trough" popularly used by a Chinese carpenter.

Figure 3A:
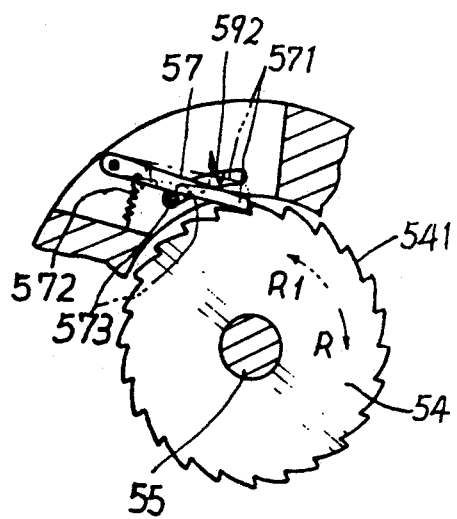
FIG. 3A shows a brake means of the plummet wire of the present invention.

For occasionally stopping the wire 52 withdrawn from the reel 54 of the plummet 5, a brake means as shown in FIGS. 3, 3A is provided for braking the wire 52, which includes: a ratchet wheel 541 formed on the reel 54 engageable with a pawl tip 571 of a pawl 57 resiliently held on the housing 59 by a pawl spring 572 retained on the housing 59 as shown in FIG. 3A, and an actuator 573 slidably held in a housing slot 592 and in a casing slot 126, whereby upon a disengagement of the pawl 57 from ratchet wheel 541 by the actuator 573, the reel 54 will be resiliently rewound and retracted in the housing 59 and in the casing 1 in direction R1 and upon a withdrawing of the wire 52, the ratchet wheel 541 will be slippingly rotated in direction R for pulling the wire 52 outwardly. The bob 51 of the plummet 5 may be withdrawn outwardly as shown in FIG. 1 for checking a vertical line or plane. Or, the casing 1 may be dismantled to take out the plummet 5 with its housing 59 as shown in FIG. 6 so that the housing 59 and all parts stored therein may serve as a plumb weight larger than the original bob 51 which may now be fixed or hanged on an upper portion (N) of a wall as shown in FIG. 6A.

The measuring tape 6 also telescopically formed in the casing 1 includes: a tape 62 wound on a tape reel 63 resiliently rotatably mounted in the casing 1 about a tape spindle 64 between the horizontal gauge 3 and the angular level 2, and a grip end portion 61 secured on an outermost end of the tape 62 normally retained on the right side plate 15. The tape 62 is unwound from the tape reel 63 to be protruded outwardly through a tape slot formed in the right plate 15 for measuring a distance or a length, longer than a length formed on the scales 112 of the casing 1. The measuring tape 6 may also be provided with the brake means 57, 541 of the plummet wire 52 as afore-mentioned as shown in FIG. 3.

Figure 2:
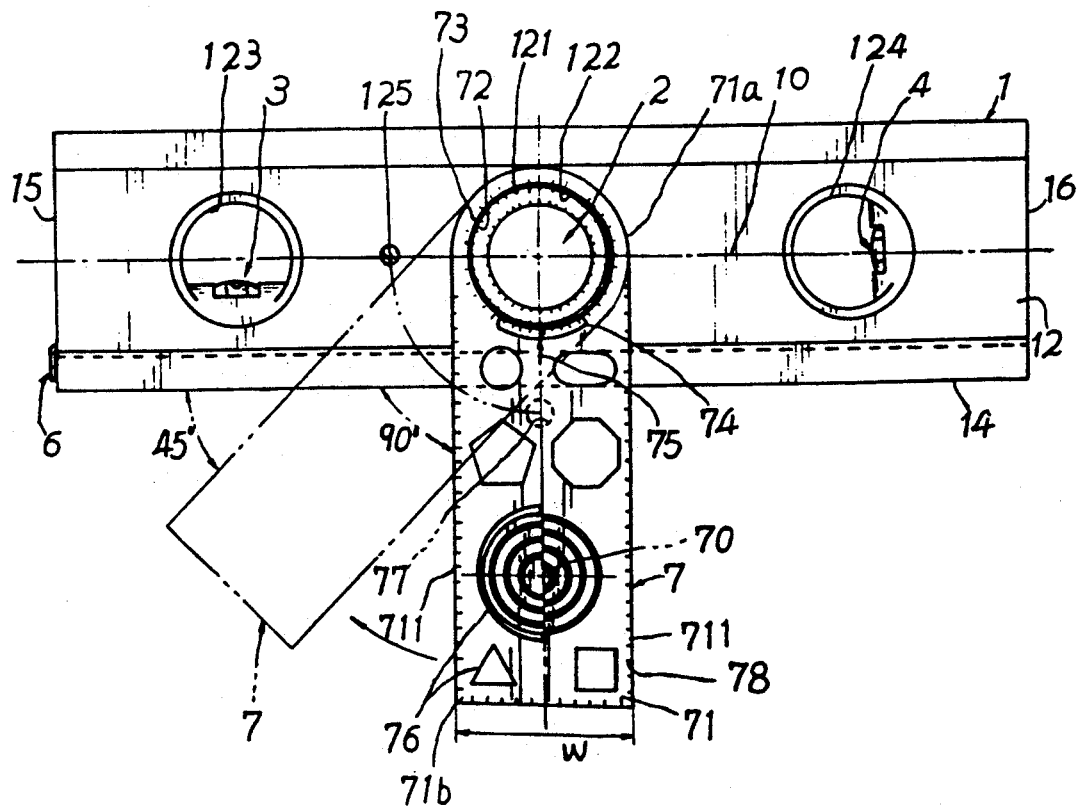
FIG. 2 is a rear view of the present invention.

The protractor template 7 as shown in FIGS. 2, 7 includes: a rectangular template member 71 having a pivoting opening 72 formed in a proximal portion 71a pivotally engageable with the circular extension 121 formed on the rear plate 12, a plurality of planar angular graduations 73 circularly formed on the rear plate 12 around the circular extension 121, a visual window 74 formed in the proximal portion 71a of the template member 71 for showing the graduations 73 through the window 74, a planar angle pointer 75 formed on a center line of the template member 71 coincidental with a normal line 70 perpendicular to a longitudinal axis 10 of the casing 1, a plurality of guide slots 76 of different geometric shapes or engineering legends punched through the template member 71, a positioning recess 77 recessed in the template member 71 engagable with a protrusion 125 formed in the rear plate 12 and a plurality of graduations 78 for measuring length formed on all side edges of the template member 71. A distal end portion 71b of the template member 71 opposite to its proximal portion 71a is perpendicular to the normal line 70 and preferably not exceeding either the left end or the right end of the casing 1 when rotatably receiving the template 7 on the casing 1. The protrusion 125 may be an end portion of a spindle for mounting the tape 6 on the casing 1. A round slot 761 having angular scales 762 are formed in the template 71 for drawing a circle.

The template member 71 includes two parallel longitudinal side-edge portions 711 longitudinally formed on two opposite longitudinal side portions of the template member 71 generally perpendicular to the distal end portion 71b of the template member 71 having a width less than a width of the casing 1, each of the longitudinal side-edge portions 711 are operatively perpendicular to a longitudinal axis 10 of the casing when the template 7 is rotated to a ninety degrees of the planar angular graduations 73 so that upon a pivotal rotation of the template member 71 about the circular extension 121 on the rear plate 12, each the longitudinal side-edge portion 711, and the bottom plate 14 may serve as a square or angle rule for drawing an angle between the longitudinal side-edge portion 711 and the bottom plate 14 of the casing 1 such as for a right angle as shown in solid line of FIG. 2 or a 45 degree angle as shown in dotted line in FIG. 2.

When not in use, the template 7 may be rotated to engage the recess 77 with the protrusion 125 formed on the plate 12 for stably positioning the template 7 on a rear or back side of the casing 1.

The guide slots 76 formed in the template 7 may serve as a guide for drawing any desired geometric shape performed in the template 7.

The present invention combines a plurality of tools or measuring tools on one instrument for multiple uses concluded as follows:

1. The casing 1 has its own length scales 112 for serving as a rule for measuring 1 length or a short distance.
2. The angular level 2 serves for measuring any angles dynamically at any slopes.
3. The horizontal gauge 3 serves for checking or establishing a horizontality.
4. The vertical gauge 4 serves for setting up or checking a verticality.
5. The reelable plummet 5 serves for checking a vertical line or plane, and the wire 52 inked by the ink absorber may serve for drawing a color line when withdrawn from the reel 54.
6. The measuring tube 6 serves for measuring a length or distance longer than that as found by the scales 112.
7. The protractor template 7 is provided for both measuring a planar angle and also for a drawing guide for drawing a geometric shape selected from those geometric shapes precut in the template 7.

Even partial elements such as tape 6 and gauge 3, 4 are so conventional, the present invention incorporates those novel elements such as the reelable plummet 5 and the protractor template 7 into the conventional known elements to have synergetic functions for multiple measuring purposes and also for combining the so many tools into one compact unit convenient for handling, operation, maintenance and cost-saving.

Figure 4:
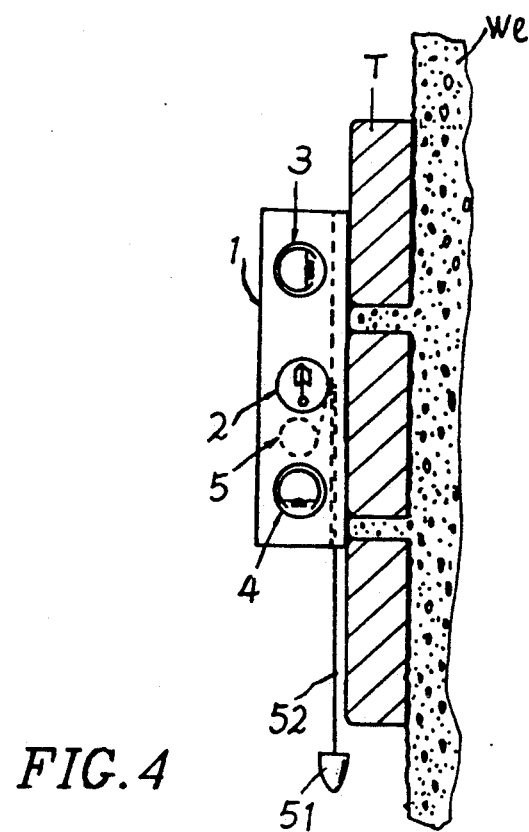
FIG. 4 is an illustration showing a checking for a vertical building structure in accordance with the present invention.

Regarding a construction job as shown in FIG. 4 for adhering a plurality of layers of tiles T on a wall W1, if a conventional hand level is provided for checking the tiles whether vertical aligned or not the conventional hand level can only check one-point (the bubble shown in a horizontal tube) verticality on a specific tile which was already adhered on the wall. If the tile is not vertically positioned, it must be removed, checked repeatedly and then re-built on the wall to cause a very inconvenient construction or maintenance job.

However, if the instrument of the present invention is used in such a construction case, the casing 1 may be contacted on a surface of an upper tile or upper tiles to establish a "basic" verticality by using the angular level 2 and or the vertical gauge 4 formed in the casing 1 and the bob 51 vertically pendant along the wire 52 may serve as a vertical "post" line, by which a lower tile or lower tiles can be subsequently adhered on an irregular wall surface W1 by checking a verticality by comparing the surface of the tiles with the "post" line played by the wire 52 and bob 51. So, this invention may always ensure a three-point calibration for checking a vertical line continuously, quickly, smoothly and precisely, especially helpful for a sophisticated construction job as found in civil engineering.

Figure 5:
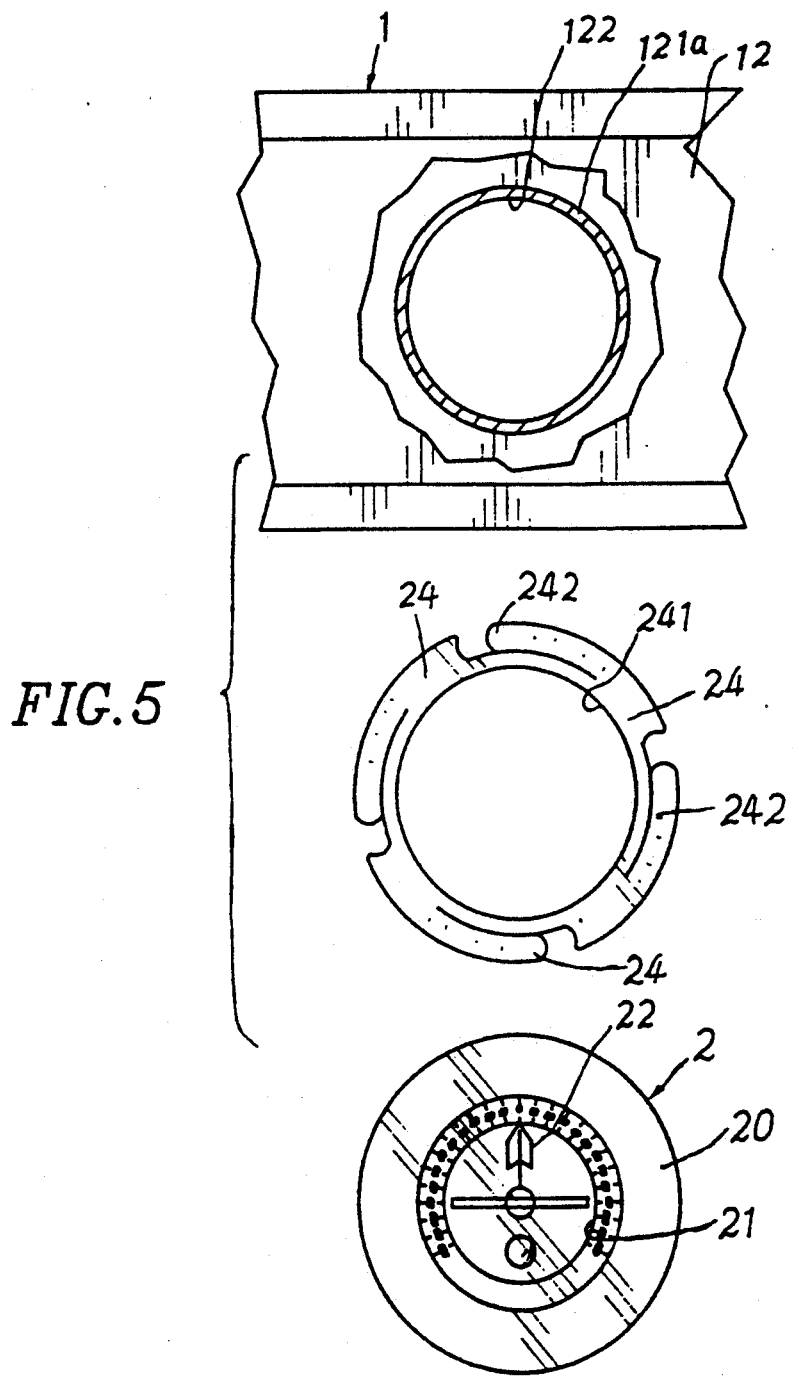
FIG. 5 is an illustration showing an assembly of an element of the present invention.

For firmly building the elements in the casing such as for mounting the angular level 2 (or gauge 3, 4) in the casing 1, a spring washer 24 as shown in FIG. 5 having a central opening 241 for showing the level 2 (or gauge 3) formed in the washer and a plurality of spring leg members 242 directly punched from the washer to resiliently retain the level 2 (or gauge 3, 4) between two plates 11, 12 of the casing 1. For mounting the central level 2, the washer 24 may be retained on an inside circular extension 121a formed on an inside surface of the rear plate 12 as shown in FIG. 5 for resiliently urging the level 2 to be retained between the front and rear plates 11, 12.

We claim:

1. A measuring instrument comprising:
    a casing formed as a longitudinal parallelepiped comprised of a front plate, a rear plate, an upper plate, a bottom plate, a right side plate and a left side plate, having two length scales longitudinally formed on an upper and a lower edge portion of said front plate;
    an angular level mounted in a central portion of said casing having a rotational protractor rotatably mounted in the angular level for measuring a sloping angle;
    a horizontal gauge mounted in a first side portion of said casing for checking a horizontally;
    a vertical gauge mounted in a second side portion of said casing for checking a verticality;
    a reelable plummet telescopically mounted in said casing between said angular level and said vertical gauge normally received in said casing and operatively protruded outwardly for checking a vertical line;
    a measuring tape telescopically mounted in said casing between said angular level and said horizontal gauge having a tape normally received in said casing and having a gripping end portion of said tape normally retained on a side portion of said casing and operatively withdrawn for measuring a distance; and
    a protractor template pivotally secured on a central portion of said casing having a plurality of planar angular graduations circularly formed in the central portion of said casing to be measured for obtaining a planar angle by said template operatively rotated about the central portion of said casing;
    said reelable plummet including: a bob secured with a wire wound on a wire reel rotatably secured on a spindle secured in the casing, a plurality of rollers slidably guiding the wire of the bob between the wire reel and a central opening of said casing and a restoring spring securing the wire reel on the spindle for restoring the wire reel for rewinding the wire on the reel to normally retract the bob into the casing, said wire protruded outwardly through a central opening formed in the bottom plate of said casing; said wire of the reelable plummet operatively led through a wire trough longitudinally recessed in the bottom plate of the casing, having a cross section of said bottom plate generally V shaped, for receiving the wire in said wire trough and for storing said bob when not in use into a cavity formed in the casing through a side opening formed at the side plate of the casing; and
    said protractor template including: a rectangular template member having a pivoting opening formed in a proximal portion pivotally engageable with a circular extension formed on the rear plate, a plurality of the plane angular graduations circularly formed on the rear plate around the circular extension, a visual window formed in the proximal portion of the template member for showing the graduations through the window, a planar angle pointer formed on a center line of the template member coincidental with a normal line perpendicular to a longitudinal axis of the casing, a plurality of guide slots of different geometric shapes punched through the template member, and a positioning recess recessed in the template member engageable with a protrusion formed in the rear plate; said template member having two parallel longitudinal side-edge portions longitudinally formed on two opposite longitudinal side portions of the template member generally perpendicular to a distal end portion of the template member opposite to the proximal portion having a width less than a width of the casing, each longitudinal side-edge portion being operatively perpendicular to a longitudinal axis of the casing when the template is rotated to indicate ninety degrees on the planar angular graduations so that upon a pivotal rotation of the template member about the circular extension on the rear plate, each longitudinal side edge portion, and the bottom plate may serve for drawing an angle between the longitudinal side-edge portion and the bottom plate of the casing.

2. A measuring instrument according to claim 1, wherein said plummet having said reel, said spindle and said restoring spring encased in a plummet housing is secured in said casing so that upon a dismantling of said casing, said plummet housing can be taken out from said casing to serve as a plumb weight when hanging said wire and said bob on an upper portion of a wall.

* * * * *